UNITED STATES PATENT OFFICE.

JOSEF WIESNER, OF VIENNA, AUSTRIA-HUNGARY, ASSIGNOR TO HEINRICH CONRIED, OF NEW YORK, N. Y.

FUEL.

SPECIFICATION forming part of Letters Patent No. 421,878, dated February 18, 1890.

Application filed October 7, 1889. Serial No. 326,267. (No specimens.) Patented in Austria-Hungary March 18, 1889.

*To all whom it may concern:*

Be it known that I, JOSEF WIESNER, of Vienna, in the Empire of Austria-Hungary, a subject of the Emperor of Austria-Hungary, have invented certain new and useful Improvements in Fuels, (patented to me in Austria-Hungary on the 18th day of March, 1889, and entered in volume 39, folio 817,) of which the following is a specification.

My improved fuel consists, essentially, of a mixture of pulverized or disintegrated combustible material—such as coal-dust, powdered coal, culm, powdered coke, powdered peat, small peat, straw, and like material—mixed with a binding substance obtained by lixiviating wood, which wood-lixivium or waste liquor of the sulphite cellulose processes is concentrated until it has about the consistency of a sirup. This concentrated waste liquor contains the resins, gums, &c., that are extracted from the wood by the lixiviating process.

In carrying out my invention I mix in a suitable apparatus a quantity of pulverized fuel—such as coal-dust, coke-dust, and like material—with the wood-lixivium, shape this mixture into suitable blocks, which dry in a very short time, and it can then be used as fuel. The proportions of wood-lixivium and pulverized combustible material vary, more or less, according to the concentration of this wood-lixivium and also according to the nature of the pulverized material. If the coal is very rich, about from five to six per cent. of highly-concentrated wood-lixivium is added; but if the coal is not very rich about ten per cent. of the wood-lixivium is added. Combustible bricks can also be made by first mixing the pulverized combustible material with tar or molten pitch and mixing the wood-lixivium with chopped straw and then combining these two mixtures, the proportions being about one hundred parts of coal-dust to ten parts of tar, one part, by weight, of chopped straw, a quarter part of water, and thirty parts of concentrated wood-lixivium. These ingredients are thoroughly mixed and shaped into bricks.

Having thus described my invention, I claim as new and desire to secure by Letters Patent—

As a new article of manufacture, fuel-blocks composed of disintegrated coal or other disintegrated combustible material and so-called "wood-lixivium" or concentrated liquor of the sulphite cellulose process, in about the proportions given, substantially as set forth.

In testimony that I claim the foregoing as my invention I have signed my name in presence of two subscribing witnesses.

JOSEF WIESNER.

Witnesses:
RUDOLF VON CLANK,
NETTIE S. HARRIS.